Oct. 26, 1937. D. HALDANE 2,096,714
BEER COIL CLEANER
Filed April 29, 1935 2 Sheets-Sheet 1
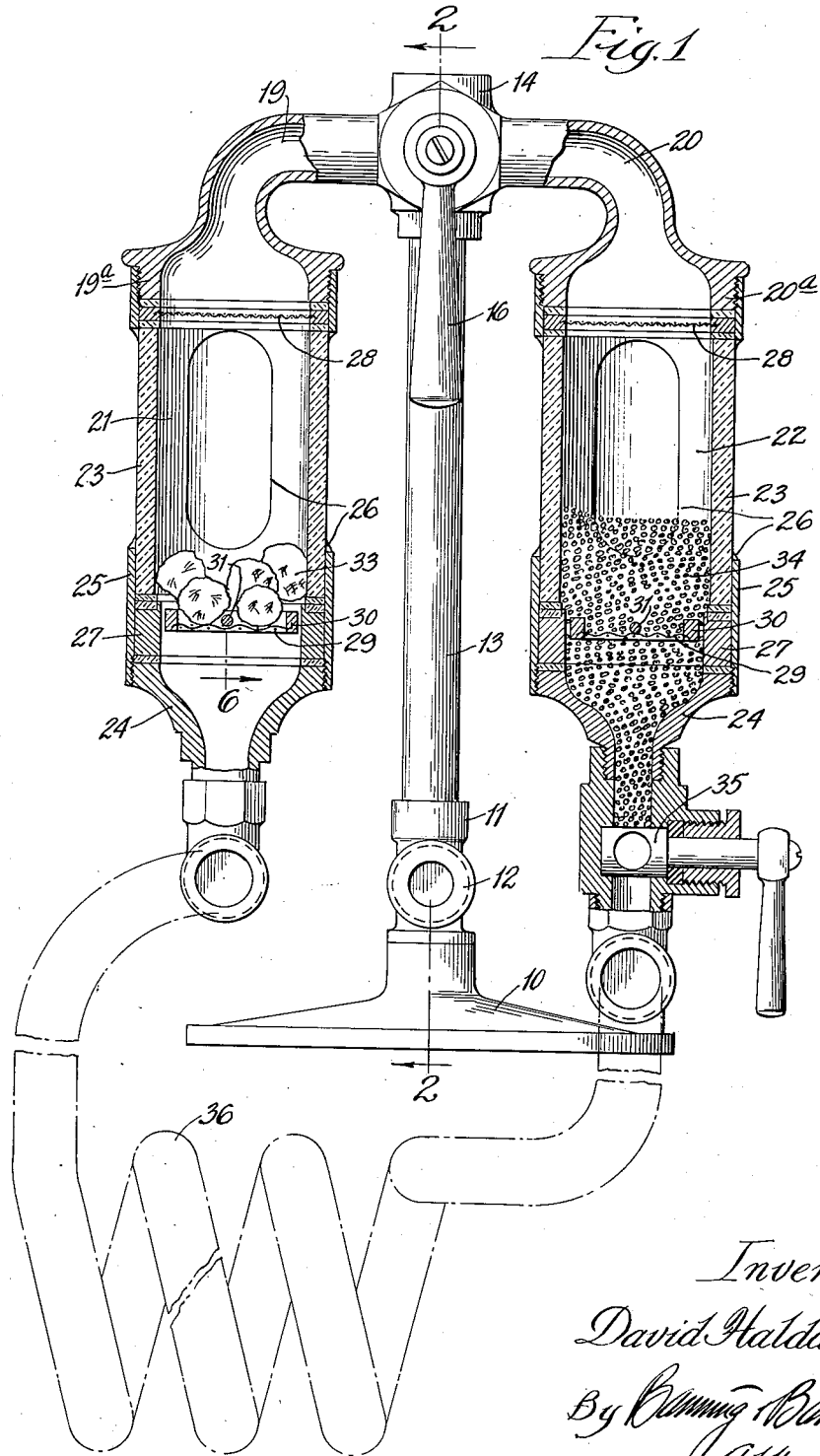
Inventor:
David Haldane,
By Banning & Banning
Attys.

Oct. 26, 1937.    D. HALDANE    2,096,714
BEER COIL CLEANER
Filed April 29, 1935    2 Sheets-Sheet 2
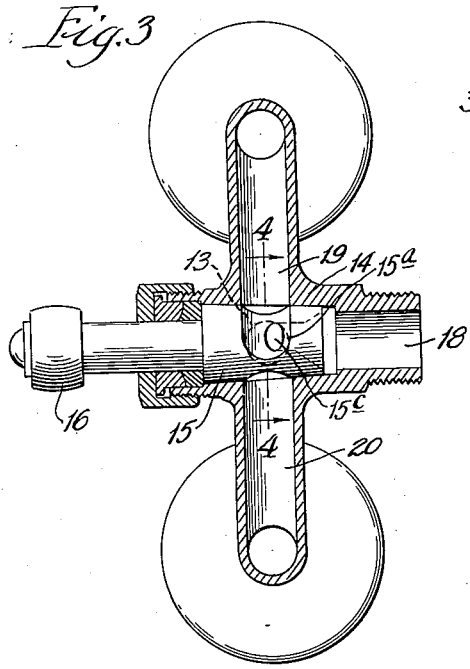
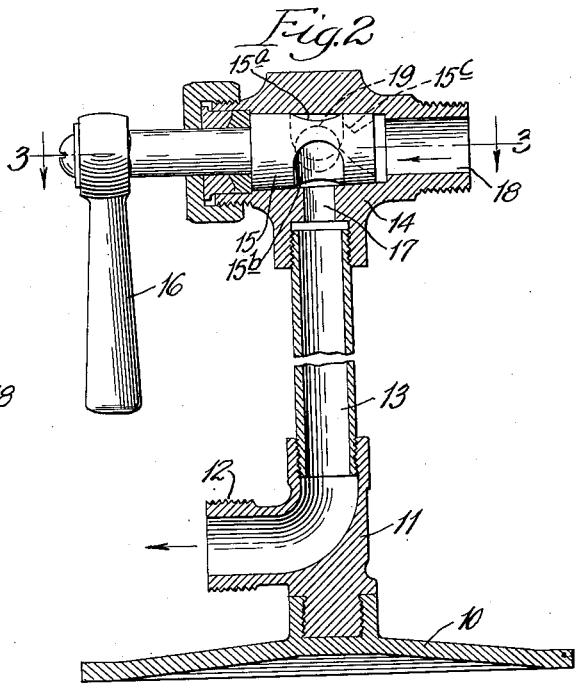
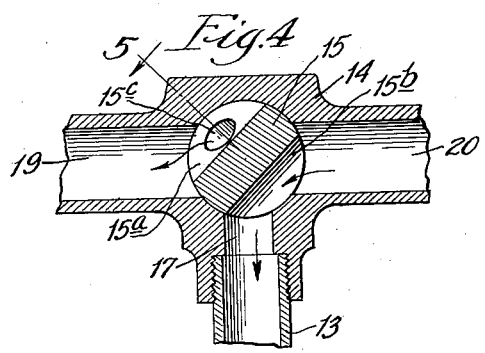
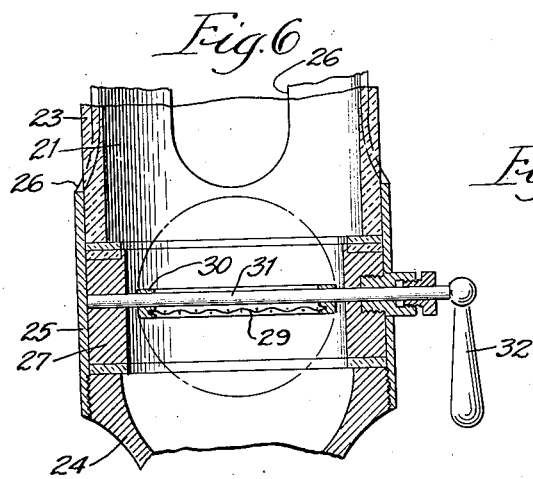
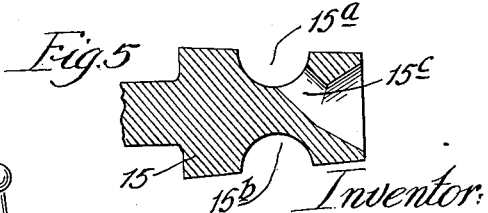
Inventor:
David Haldane
By Benning & Benning
Attys.

Patented Oct. 26, 1937

2,096,714

UNITED STATES PATENT OFFICE 2,096,714

BEER COIL CLEANER

David Haldane, Chicago, Ill., assignor to Brass Products Company, Chicago, Ill., a co-partnership composed of Harry W. Anderson and Herman W. Kuehl Application April 29, 1935, Serial No. 18,756

3 Claims. (Cl. 225—12)

An object of this invention is to provide a simplified and condensed form of beer coil cleaner, and one which is adapted particularly for use on a water pressure system.

Another object is to provide in a cleaner of this type means for readily separating the "pearls" or small solid particles as glass beads from the "sponges" or larger compressible cleaning units, such as sponge rubber.

These and other objects, as will hereinafter appear, are accomplished by this invention which is fully described in the following specification and shown in the accompanying drawings in which—

Figure 1 is a front elevation of the device partly in section, showing it attached to a beer coil or the like to be cleaned;

Fig. 2 is a partial vertical section on the line 2—2 of Fig. 1;

Fig. 3 is a horizontal section on the line 3—3 of Fig. 2;

Fig. 4 is a partial enlarged vertical section on the line 4—4 of Fig. 3;

Fig. 5 is a section through the plug valve on the line 5 of Fig. 4; and

Fig. 6 is a partial enlarged section on the line 6 of Fig. 1.

The embodiment illustrated comprises a base 10 to which is secured a fitting 11 which has a screw threaded nozzle 12 at one end adapted to be connected by means of a hose or the like not shown, but which may be carried to a drain. A pipe 13 connects into the top of the fitting 11, and this is screwed into the bottom of a valve casting 14 into which is rotatably fitted a plug valve 15 which is operated by means of a handle 16.

The casting 14 has four passages for water, namely, a passage 17 leading to the pipe 13, an inlet water passage 18 adapted to be connected with a water faucet or other source of water supply under pressure, and two lateral passages 19, 20 (Fig. 1) which have flaring lower ends 19ª, 20ª respectively, which form the upper ends of the chambers 21, 22.

The plug valve 15 is conical and is pressed against a conical seat in any well known manner. This valve has two lateral grooves 15ª, 15ᵇ which are preferably semi-cylindrical. A passage 15ᶜ leads from the groove 15ª to the end of the groove where it communicates with the passage 18 of Fig. 2. The chamber 21 is provided with a cylindrical glass side wall 23 which is provided with a threaded bottom 24. A sleeve 25 has ends into which screw the threaded bottom 24 and the flared and threaded end 19ª, and has lateral windows 26. Within the sleeve are a glass cylinder 23 and a ring 27 with suitable gaskets placed between these parts and the end 19ª to prevent leakage of water passing therethrough.

A relatively fine mesh screen 28 is provided at the top of the chamber, while a coarse mesh screen 29 is carried in a circular frame 30 which is mounted on a shaft 31 which passes through the side of the chamber and is rotatable by means of a handle 32. The screen 29 is sufficiently fine to stop sponges 33 and hold them, say in the chamber 21, but coarse enough to permit the passage of "pearls" 34, as shown in the lower portion of the chamber 22. The screen 28, however, is fine enough to prevent the passage of the pearls. A valve 35 is provided beneath one of the chambers to retain the pearls therein when the valve is shut off, as shown in Fig. 1. The lower ends of the chambers are connected through suitable connections with the pipes and coils 36 to be cleaned. These are shown diagrammatically in Fig. 1.

The operation of the device is as follows: Starting with the sponges in the chamber 21 and the pearls in the chamber 22, the valve 15 is turned so as to force water through the chamber 22, the valve 35 then being opened so as to permit the water and the pearls to pass down from right to left through the coil 36, and up into the chamber 21 where the pearls are stopped by the screen 28, but the water passes on through the pipe 13 to the drain.

Upon turning the valve 15 so as to reverse the direction of flow through the chambers 21, 22 and the coil 36, the pearls will pass from the chamber 21 through the coil and into the chamber 22, again being stopped by the fine mesh screen at the top of the latter chamber. Thus by reversing the valve 15 the pearls can be sent back and forth through the coil 36 as often as may be deemed necessary to clean the coil of any deposit which may have formed therein.

To finish this cleaning, the screens 29 at the bottom two chambers are then turned so as to permit the sponges 33 to pass through the coils with the pearls as the direction of flow of the water is reversed by means of the valve 15. To end up the operation, the sponges 33 may be left in either chamber desired by turning the screen in the bottom of the chamber so as to retain them after they are in that chamber. The pearls must end up in the chamber 22, after which the valve 35 is turned so as to retain them. Any water that is left in these chambers may be drained out by turning the apparatus upside down after detachment from the coil 36 and from the faucet and from the drain pipes.

While I have shown and described but a single embodiment of my invention, it is to be understood that it is capable of many modifications. Changes, therefore, in the construction and arrangement may be made which do not depart from the spirit and scope of the invention as disclosed in the appended claims.

I claim:

1. In a device of the class described, two chambers each having an upper and a lower orifice, relatively fine mesh screen across the upper end of the chamber, inlet and outlet water passages, a rotatable valve adapted to selectively operatively connect the upper orifice of one of the chambers to either the inlet or the outlet passage and the other orifice to the other passage, a relatively coarse mesh screen in each of the lower orifices, said coarse mesh screen being adapted to pass pearls but not sponges, means for shifting each coarse mesh screen from open position in which it passes both pearls and sponges to closed position so as to prevent the passage of sponges but permitting the passage of pearls, and a valve in one of the lower orifices for substantially closing same to prevent the passage of pearls.

2. In a device of the class described, two chambers each having an upper and a lower orifice, relatively fine mesh screens across the upper ends of the chambers, inlet and outlet water passages, a rotatable valve adapted to selectively operatively connect the upper orifice of one of the chambers to either the inlet or the outlet passage and the other orifice to the other passage, a relatively coarse mesh screen in each of the lower orifices, said coarse mesh screen being adapted to permit the passage of pearls but not sponges, and means for shifting each coarse mesh screen to or from the position in which it acts as a barrier to the passage of the sponges.

3. A device as set forth in claim 2, having a valve in one of the lower orifices for substantially closing the same to prevent the passage of pearls.

DAVID HALDANE.